United States Patent
Wehrend

(12) 
(10) Patent No.: US 6,546,008 B1
(45) Date of Patent: Apr. 8, 2003

(54) METHOD AND CONFIGURATION FOR PROVIDING PERFORMANCE FEATURES VIA A COMMUNICATIONS NETWORK

(75) Inventor: Klaus Wehrend, Eichenau (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/259,637

(22) Filed: Mar. 1, 1999

(30) Foreign Application Priority Data

Feb. 27, 1998 (DE) .......................... 198 08 368

(51) Int. Cl.⁷ .................. H04L 12/50; H04Q 11/00
(52) U.S. Cl. ................. 370/384; 370/259; 370/271; 370/466; 370/904; 379/201.01; 455/414
(58) Field of Search ................. 370/259, 271, 370/360, 384, 466, 904; 379/201.01; 455/414, 415, 416, 417, 466

(56) References Cited

U.S. PATENT DOCUMENTS

| | | | | |
|---|---|---|---|---|
| 5,351,135 A | * | 9/1994 | Saeger ........................ 348/435 |
| 5,404,491 A | * | 4/1995 | Huzenlaub et al. ......... 395/500 |
| 5,537,392 A | * | 7/1996 | Wille et al. .................... 370/14 |
| 5,610,920 A | * | 3/1997 | Doll et al. ..................... 370/389 |
| 5,719,918 A | * | 2/1998 | Serbetciouglu et al. ....... 379/58 |
| 5,793,860 A | * | 8/1998 | Brieskorn ..................... 379/229 |
| 5,854,789 A | * | 12/1998 | Lesh et al. ................... 370/395 |
| 5,936,957 A | * | 8/1999 | Hartmann et al. .......... 370/395 |
| 5,978,672 A | * | 11/1999 | Hartmaier et al. ........... 455/413 |
| 6,081,520 A | * | 6/2000 | Kaschulla et al. ........... 370/357 |
| 6,085,099 A | * | 7/2000 | Ritter et al. ................. 455/466 |
| 6,125,281 A | * | 9/2000 | Wells et al. ................. 455/466 |
| 6,353,745 B1 | * | 3/2002 | Wehrend et al. ............ 455/466 |

OTHER PUBLICATIONS

G. Apfelauer, Dr. H. Evers, and Dr. K. Hofmann. CorNet: Siemen's Contribution to the Standardization of Signaling in Corporate ISDN Networks. 1988 IEEE. pp. 57–62.*
Dr. S. Youngberg, optiset E IPadapter—Add Value to Your Business. Siemens Information and Communication Networks 2000. pp. 1–4.*
Dr. S. Youngberg. optiPoint IP adapter—Add Value to Your Business with VoIP. Siemens Information and Communication Networks 2000. pp. 1–5.*
"Das virtuelle Büro", telcomreport, Issue 4, 1997, Siemens AG Berlin and Munich, Germany, pp. 1–5.

* cited by examiner

*Primary Examiner*—Hassan Kizou
*Assistant Examiner*—Joe Logsdon
(74) *Attorney, Agent, or Firm*—Laurence A. Greenberg; Werner H. Stemer; Gregory L. Mayback

(57) ABSTRACT

When an external terminal is signed on to a communications system, a data link is set up between the external terminal and a teleworking subscriber line module of the communications system. Until the external terminal is signed off, terminal-oriented signaling information, such as is usually available within the framework of a signaling protocol between internal terminals and the communications system, is transferred between the external terminal and the communications system via the data link.

15 Claims, 2 Drawing Sheets

METHOD AND CONFIGURATION FOR PROVIDING PERFORMANCE FEATURES VIA A COMMUNICATIONS NETWORK

BACKGROUND OF THE INVENTION

FIELD OF THE INVENTION

The invention lies in the field of electronic communication. Specifically, the invention pertains to a method and a configuration which provides performance features via a communications network.

Because working conditions are becoming increasingly flexible in terms of time and location, the number of employees who do not carry out their professional tasks at their office provided by the employer is rising continuously. The publication "Das virtuelle Büro" [The Virtual Office], in telcomreport, Issue 4, 1997, Siemens AG Berlin and Munich, Germany, describes that for tasks to be carried out effectively outside the company it is necessary to have access to the communications performance features provided in the company's local communications network, irrespective of the location of the employee. These performance features include the performance features, such as, for example, the setting-up of a conference circuit, automatic call-back, signaling of the inputting of a message and voice-mail services, which are additional to the standard performance features provided in an ISDN communications network.

SUMMARY OF THE INVENTION

It is accordingly an object of the invention to provide a method and a configuration for providing performance features in a communications system, which is improved with regard to the disadvantages and shortcomings of the prior art methods and devices of this general type and which allows performance features implemented by a communications system to be made available at an external terminal.

With the foregoing and other objects in view there is provided, in accordance with the invention, a method in a communications system with defined performance features available at internal subscriber terminals of the communications system wherein internal terminals of the communications network communicate within a framework of a defined signaling protocol. The method renders the performance features available at an external terminal via a communications network, and the method comprises:

providing a teleworking subscriber line module having a switching device in the communications system; establishing a data link on a user data channel (ISDN-B channel) of the communications system between an external terminal and the teleworking subscriber line module by signing on to the communications system with the external terminal; and transferring to the external terminal, via the data link, terminal-oriented signaling information usually available within the framework of the signaling protocol between the internal terminals and the communications system.

In other words, the performance features which are implemented by a communications system are made available at an external terminal in the same way as at an internal terminal. Terminal-oriented signaling information, such as is usually transferred within the scope of a signaling protocol Cornet-Ts between the communications system and internal terminals which are connected to it, is made available between the communications system and the external terminal.

A significant advantage of the invention is that the system components which are necessary for the so-called teleworking concept which can be implemented by means of the invention can easily be integrated into an existing communications system.

A further advantage of the invention consists in the fact that the configuration of the necessary system components on a separate teleworking subscriber line module makes it possible easily to perform changes to the teleworking concept which can be implemented by means of the invention.

In accordance with an added feature of the invention, the step of establishing the data link between the external terminal and the teleworking subscriber line module comprises converting a data format of the user data channel to a data format of a local computer network connected to the teleworking subscriber line module.

In accordance with an additional feature of the invention, the teleworking subscriber line module is controlled with a teleworking computer connected to a local computer network, and carrying terminal-oriented signaling information from and to the teleworking subscriber line module via the teleworking computer.

In accordance with another feature of the invention, subscriber-specific data is transferred from the external terminal via the data link, and a sign-on is authorized by the teleworking computer with reference to the subscriber-specific data.

In accordance with a further feature of the invention, in the course of a sign-on operation, there is performed a step of assigning to the external terminal a first virtual subscriber connection port of the teleworking subscriber line module with the teleworking computer, and rerouting signaling information routed by a control unit of the communications system to an internal subscriber terminating line identified by the subscriber-specific data to a virtual subscriber connection port.

In accordance with again an added feature of the invention, there is decided in the teleworking subscriber line module, with reference to destination address information contained in signaling information transmitted from the teleworking computer or from the control unit to the teleworking subscriber line module, whether the signaling information received by the teleworking computer is to be transferred on to the control unit, or the signaling information received by the control unit is to be transferred on to the teleworking computer.

In accordance with again an additional feature of the invention, while establishing a data link, subsequent to the sign-on, between the external terminal and a further terminal, a first partial link is set up between the further terminal and a first virtual subscriber connection port of the teleworking subscriber line module.

In accordance with again another feature of the invention, a second partial link is set up between a second virtual subscriber connection port of the teleworking subscriber line module and the external terminal.

In accordance with again a further feature of the invention, the first and second partial links are coupled to one another in the teleworking subscriber line module, forming a link between terminals.

In accordance with yet an added feature of the invention, the signaling information is transferred when a link is established between the external terminal and the communications system in the form of terminal-oriented signaling information via the data link.

In accordance with yet an additional feature of the invention, there is provided a step of simultaneously routing a plurality of terminal links in each case between one external terminal signed on to the communications system and one further terminal via the teleworking subscriber line module.

In accordance with yet another feature of the invention, the internal subscriber terminating line is set up merely in the form of a virtual connection port.

In accordance with yet a further feature of the invention, the external terminal is connected to the communications system via a network selected from the group consisting of an ISDN-oriented communications network, an analog communications network, and a radio communications network.

With the above and other objects in view there is also provided, in accordance with the invention, a teleworking subscriber line module in a communications system, the communications system having a control unit and a switching matrix unit with a bi-directional, time-division-multiplex-oriented port, comprising:

a LAN connection unit having a LAN interface for connecting to a local computer network;

a signaling unit having an HDLC interface for connecting to a control unit of a communications system;

a PCM connection unit having a PCM interface for connecting to a bi-directional, time-division-multiplex-oriented port of a switching matrix unit of the communications system, the PCM connection unit having a module switching-matrix unit for switching user data links routed via the PCM interface; and a conversion unit connected to the signaling unit and to the PCM connection unit for converting, in accordance with a given protocol, and forwarding data between the signaling unit and the PCM connection unit.

One advantage of refinements of the invention is that a subscriber who has signed on to the communications system at an external terminal can be accessed on the same call number as at an internal terminal assigned to him.

By assigning virtual connection ports—often referred to as pseudo-connection ports in the pertinent literature—subscribers can utilize the performance features of the communications system at an external terminal even if they do not have a physically existing internal terminal assigned to them.

Other features which are considered as characteristic for the invention are set forth in the appended claims.

Although the invention is illustrated and described herein as embodied in a method and configuration for providing performance features via a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
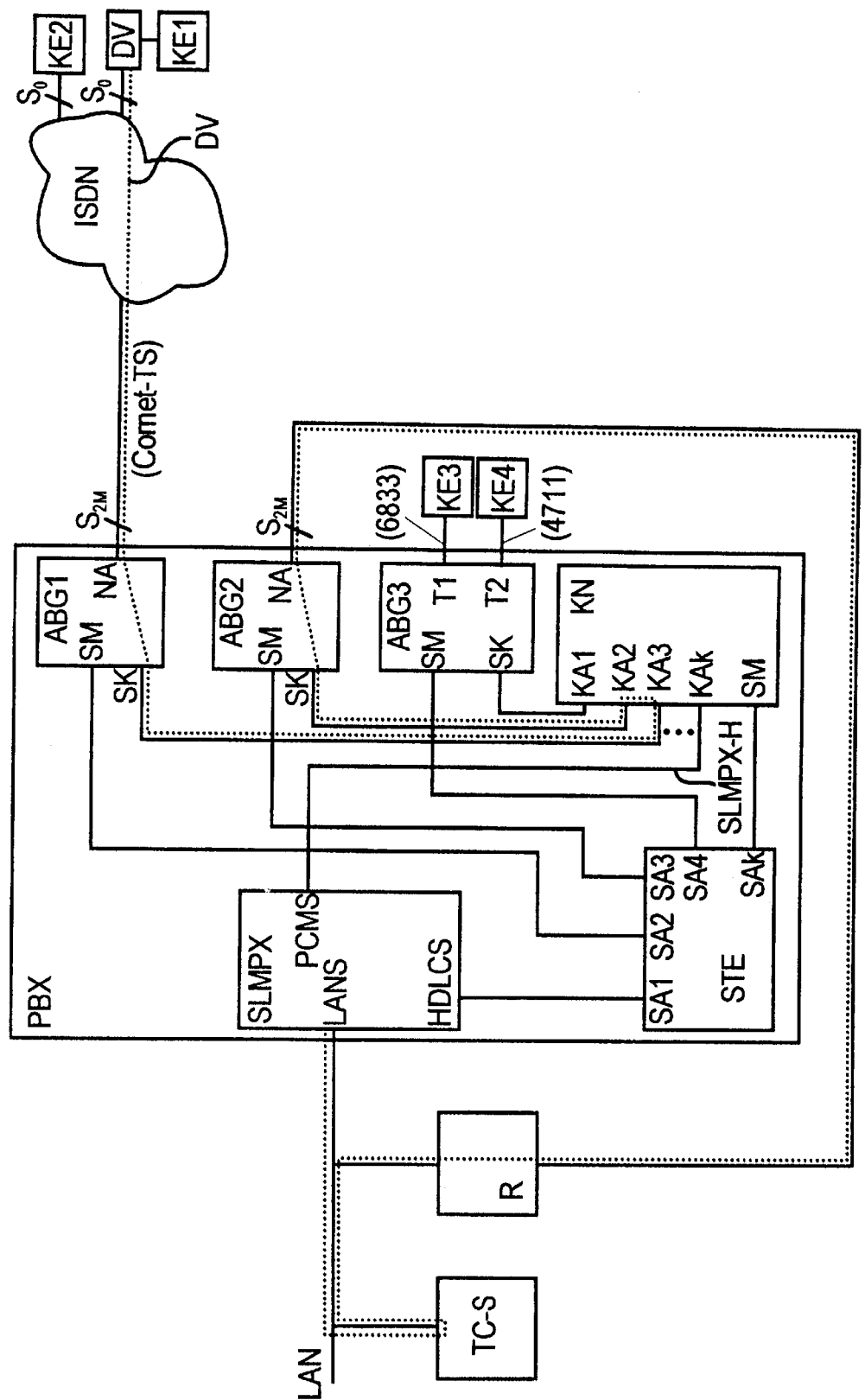
FIG. 1 is a schematic, structural diagram illustrating the essential functional units involved in the teleworking concept.

Referring now to the figures of the drawing in detail and first, particularly, to FIG. 1 thereof, there is seen a communications system PBX with a teleworking subscriber line module—referred to below as teleworking module SLMPX—arranged in the system. The module SLMPX is implemented in the form of a subscriber terminal unit. The communications system PBX has further subscriber terminal units/network connection units in the form of a first, a second, and a third connection unit ABG1, ABG2, ABG3, for example, for connection to communications terminals. Furthermore, the communications system PBX contains a switching matrix unit KN which has a plurality of bi-directional, time-division-multiplex-oriented connection ports KA1 . . . Kak. The time-division-multiplex-oriented connection ports KA1 . . . KAk are realized in the form of PCM connections (PCM=Pulse Code Modulation), also referred to as PCM highways, speech highways or $S_{2M}$ connections. Each PCM highway comprises both 30 user channels, which are realized in the form of ISDN-oriented B channels (ISDN=Integrated Services Digital Network) with a transmission rate of 64 kbit/s, and a signaling channel, which is realized in the form of an ISDN-oriented D channel with a transmission rate of 64 kbit/s. The switching matrix unit KN is connected via the connection port KAk to a bi-directional, time-division-multiplex-oriented PCM interface PCMS of the teleworking module SLMPX. Via the further PCM ports KA1, KA2, KA3, the switching matrix unit KN is connected to a bi-directional time-division-multiplex-oriented connection SK of the first, second and third connection units ABG1, ABG2, ABG3, respectively.

Furthermore, a control unit STE with a plurality of control connections SA1 . . . SAk is arranged in the communications system PBX. The control unit STE is connected to a control input SM of the switching matrix unit KN via a control connection SAk. Via the further control connections SA1 . . . SA4 the control unit STE is connected both to an HDLC interface HDLCS, which is arranged at the teleworking module SLMPX, and to control connections SM of the first, the second and the third connection units ABG1, ABG2, and ABG3.

An ISDN-oriented communications network ISDN is connected to a network connection NA—for example a bi-directional time-division-multiplex-oriented $S_{2M}$ connection—of the first connection unit ABG1. A first external terminal KE1 with a data processing device DV, which may be designed, for example, as a personal computer or as a slide-in card for an existing terminal and a second external terminal KE2 are connected to the ISDN-oriented communications network ISDN, for example by means of an $S_0$ interface. A connection to a local Ethernet LAN (LAN= Local Area Network) computer network LAN, which connects a plurality of computers (only one computer TC-S is illustrated), is made via a network port NA of the second connection unit ABG2 using a network coupling unit. That connection will be designated below as router R. A first internal terminal KE3 with a communications-system-internal call number 6833 is connected to a first subscriber terminating line T1—for example an $S_0$ connection (2B+D, i.e. two ISDN user data channels and an ISDN signaling channel)—of the third connection unit ABG3, and a second internal terminal KE4 with a communications-system-internal call number 4711 is connected to a second subscriber terminating line T2.

To connect the ISDN-oriented communications network ISDN to the local computer network LAN, the router R is equipped both with an $S_{2M}$ interface and with a standard LAN interface. The $S_{2M}$ interface is connected to the network port NA of the second connection unit ABG2 of the communications system PBX, and the LAN interface of the router R is connected to the local computer network LAN. In terms of its essential function, a router implements the layer 3 (network layer) of the OSI reference model (OSI= Open Systems Interconnection), a router being used to connect networks physically to in each case a different topology of the layers 1 (bit transmission layer) and 2 (data link layer)—for example Ethernet LAN and ISDN communications network. In order to switch data packets between the networks which are connected to a router, the address information which is contained in routing information in the data packet—for example destination and source address— is interpreted and evaluated by a control device located in the router. Then, the data packets are converted for switching in accordance with the protocol.

The local computer network LAN is connected to the teleworking module SLMPX via a LAN interface LANS. A computer, for example a personal computer—referred to below as teleworking computer TC-S—which is used to control the teleworking module SLMPX—is arranged in the local computer network LAN.

Figure 2:
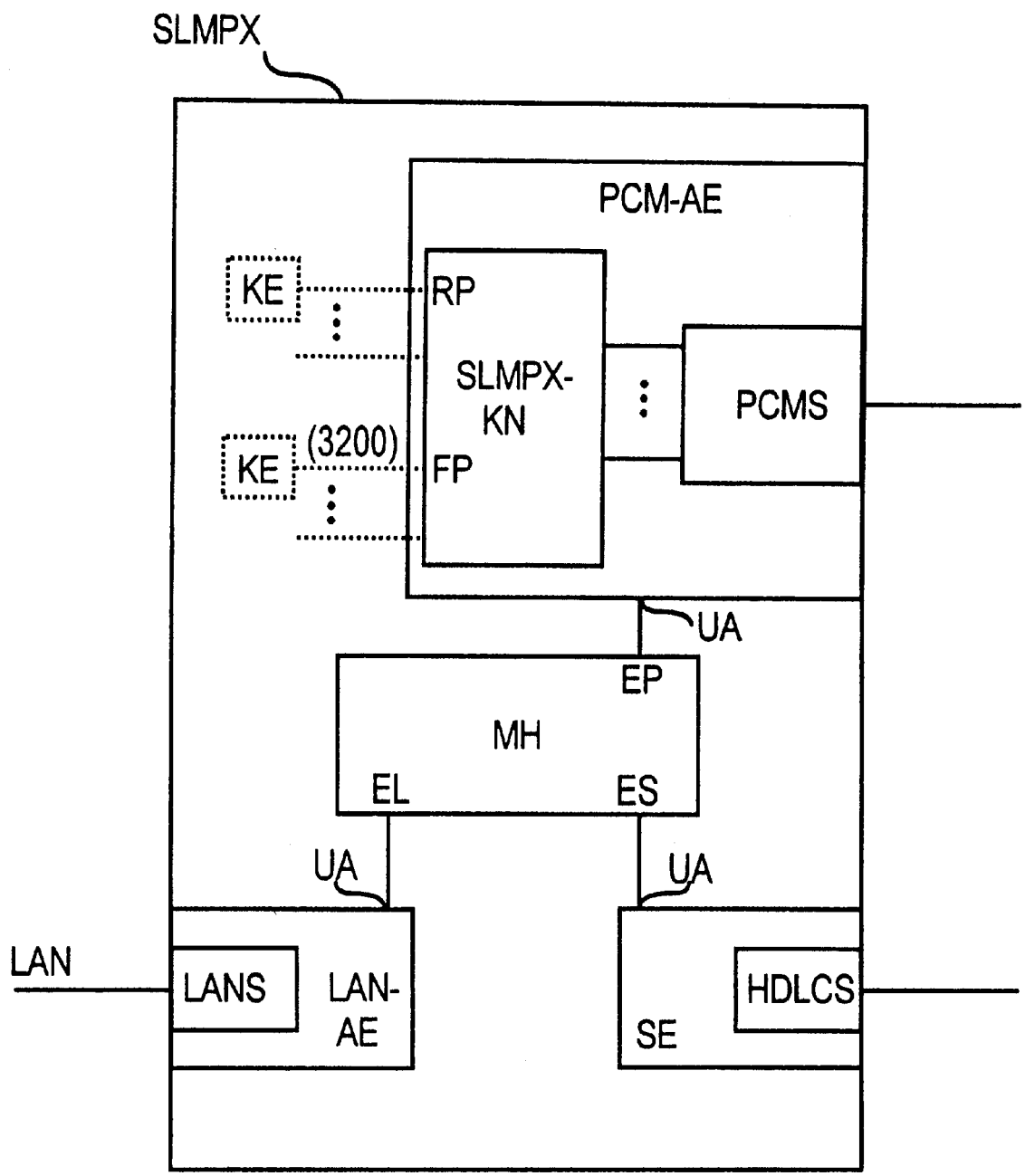
FIG. 2 is a structural diagram schematically illustrating the essential functional units of a teleworking subscriber line module of a communications system.

Referring now to FIG. 2, there is shown a schematic representation of the essential functional units of the teleworking module SLMPX. The teleworking module SLMPX has a LAN connection unit LAN-AE with a LAN interface LANS. It is possible to connect the LAN interface LANS to the local computer network LAN. The teleworking module SLMPX also has a PCM connection unit PCM-AE with a bi-directional, time-division-multiplex-oriented PCM interface PCMS, and with a module switching-matrix unit SLMPX-KN which is connected to the PCM interface PCMS. The PCM interface PCMS can be connected via a PCM highway SLMPX-H to the PCM port KAk of the switching-matrix unit KN of the communications system PBX.

Furthermore, a signaling unit SE, with an HDLC interface HDLCS, is arranged at the teleworking module SLMPX. The signaling unit SE can be connected to the control port SA1 of the control unit STE of the communications system PBX via the HDLC interface HDLCS. The LAN connection unit LAN-AE, the PCM connection unit PCM-AE and the signaling unit SE are each connected via a port UA to a port EL, EP, ES of a conversion unit MH which is arranged at the teleworking module SLMPX.

In the conversion unit MH it is decided, by reference to address information—i.e. destination and source data— which is contained in signaling data received by the teleworking computer TC-S or by the control unit STE of the communications system PBX, whether the signaling information received by the teleworking computer TC-S is to be transferred on via the signaling unit SE to the control unit STE, or whether the signaling information received by the control unit STE is to be transferred on via the LAN connection unit LAN-AE to the teleworking computer TC-S. If this is the case, this information is converted in accordance with the protocol and transferred onto the destination address.

Data packets are transferred between the LAN connection unit LAN-AE and the teleworking computer TC-S on the basis of the TCP/IP protocol (TCP/IP=Transmission Control Protocol/Internet Protocol) for example. Data packets are transferred between the control unit STE of the communications system PBX and the signaling unit SE on the basis of the HDLC protocol (HDLC=High Level Data Link Control).

If a 'teleworking' sign-on is initiated, for example, at the first external terminal KE1 by a subscriber, a data link DV (represented in FIG. 1 by broken lines) between the first external terminal KE1 and the teleworking computer TC-S is set up via one of the two B channels of the $S_0$ interface, using the first connection unit ABG1, the switching-matrix unit KN, the second connection unit ABG2 and the router R. The authorization of an access via the ISDN-oriented communications network ISDN to the local computer network LAN is checked by means of the router R. For this purpose, for example the source and destination addresses which are contained in the data which are to be transferred for the link set-up of the data link DV are checked for their reliability— which is also referred to as source and destination testing. As part of the checking of the source address which designates the first external terminal KE1, it is determined with reference to a list (not illustrated) of the authorized call numbers, whether the call number of the first external terminal KE1 is one of the authorized call numbers. In this way, inadmissible links via the ISDN communications network ISDN are prevented by the first external terminal KE1. As an alternative or in addition to this, the access authorization can also be checked by transferring a password.

Instead of an external router R, the data link DV may alternatively be routed via a network coupling unit which is arranged in the communications system PBX and which implements a direct link between the switching-matrix module KN of the communications network PBX and the local computer network LAN.

For the signing on of the first external terminal KE1 to the teleworking computer TC-S, for example the communications-system-internal call number of an internal terminal which is assigned to the subscriber—for example the call number 4711 of the second internal terminal KE4— and an associated subscriber-specific PIN code PIN (PIN= Private Identification Number) are entered. Both items of information are transferred to the teleworking computer TC-S via the data link DV. If the subscriber is not assigned any internal terminal connected to the communications system PBX, the call number of a virtual connection port— that is a connection port which is present in purely logical terms, that is to say only in terms of administration and does not have any hardware components—of the communications system PBX may alternatively be transferred.

The sign-on of the first external terminal KE1 is checked by reference to a list stored in the teleworking computer TC-S. The list contains the communications-system-internal call numbers which are authorized for the teleworking process. If the check confirms the sign-on, a virtual connection port—for example the virtual connection port FP with the communications-system-internal call number 3200—of the teleworking module SLMPX is assigned to the first external terminal KE1 by the teleworking computer TC-S. At the same time, the activation of the "call rerouting" performance feature which is implemented by the communications system PBX causes all the calls which are routed to the internal connection port, which is designated by the communications-system-internal call number, to be rerouted to the virtual connection port FP of the teleworking module SLMPX.

In addition, provided that the first external terminal KE1 has been signed on to the communications system PBX, all terminal-oriented signaling information which is to be transferred from the control unit STE of the communications system PBX to the second internal terminal KE4 (communications-system-internal call number 4711) is rerouted to the virtual connection port FP (with the communications-system-internal call number 3200) of the teleworking module SLMPX. The terminal-oriented signaling information is based on a signaling protocol Cornet-TS, such as is usually available during the exchange of signals between internal terminals and the communications system PBX. The terminal-oriented signaling information is transferred from the control unit STE of the communications system PBX to the teleworking computer TC-S via the teleworking module SLMPX. For this purpose, the terminal-oriented signaling information which is received via the HDLC interface HDLCS of the signaling unit SE is evaluated in the conversion unit MH, converted in accordance with the protocol and transferred on to the teleworking computer TC-S via the LAN interface LANS of the LAN connection unit LAN-AE.

The teleworking computer TC-S transfers the terminal-oriented signaling information to the first external terminal KE1 via the data link DV. The transfer of terminal-oriented signaling information, based on the signaling protocol Cornet-TS, to the first external terminal KE1 makes all the performance features which can be implemented by the communications system PBX available to the first external terminal KE1 in the same way as they are made available to the second internal terminal KE4. Terminal-oriented signaling information is transferred from the first external terminal KE1—assuming that it is then signed onto the communications system PBX—to the control unit STE of the communications system PBX in the same way, in reverse order.

In the case of a link set-up brought about from the first external terminal KE1—assuming that it has been signed on to the communications system PBX—the set-up taking place, for example, as a result of the receiver at the first external terminal KE1 being picked up—to a further (internal or external) terminal—for example to the first internal terminal KE3—a connection set-up message is transferred via the data link DV to the telecommunications computer TC-S. The telecommunications computer TC-S transfers on a link set-up message for the virtual connection port FP of the teleworking module SLMPX to the control unit STE of the communications system. Subsequently, in a first step, the control unit STE of the communications system PBX sets up a partial link between the virtual connection port FP of the teleworking module SLMPX and the switching matrix unit KN of the communications system PBX by seizing a free user channel of the PCM highway SLMPX-H.

In a subsequent step, the teleworking computer TC-S transfers a ready message to the first external terminal KE1 via the data link DV. The first external terminal KE1 subsequently transmits, in a response message, the call number, assigned in the ISDN-oriented communications network ISDN, of the free ISDN-B channel to the teleworking computer TC-S via the data link DV. In a further step, a further partial link to the first external terminal KE1 is set up, starting from a further virtual connection port RP of the teleworking module SLMPX. After the partial link has been connected to the further partial link in the module switching-matrix unit SLMPX-KN of the teleworking module SLMPX, a dial tone (signals readiness for the entry of dialing information) is issued at the first external terminal KE1.

The dialing information—for example 6833 for the first internal terminal KE3—which is then entered at the first external terminal KE1 is transferred via the data link DV to the telecommunications computer TC-S and from there it is transferred on via the teleworking module SLMPX to the control unit STE of the communications system PBX. Subsequently, a terminal link is set up between the first internal terminal KE3 and the first external terminal KE1 by the control unit STE of the communications system PBX.

In the case of a link set-up which is brought about starting from a further (external or internal) terminal to the second internal terminal KE4, a partial link is set up, by the communications system PBX, between the further terminal and the virtual connection port FP of the teleworking module SLMPX—assuming that the first external terminal KE1 is signed onto the communications-system-internal call number of the second internal terminal KE4—on the basis of the activated call diversion for the second internal terminal KE4. In a subsequent step, a ready message is transferred from the teleworking computer TC-S to the first external terminal KE1 via the data link DV. The first external terminal KE1 subsequently transmits, in a response message, the call number, assigned in the ISDN-oriented communications network ISDN, of the free ISDN-B channel to the teleworking computer TS-S via the data link DV. In a further step, a further partial link to the first external terminal KE1 is set up, starting from the further virtual connection port RP of the teleworking module SLMPX. In a final step, the partial link and the further partial link in the module switching-matrix unit SLMPX-KN of the teleworking module SLMPX are coupled, as a result of which the link between the first external terminal KE1 and the further terminal is brought about.

The terminal-oriented signaling information which is to be transferred between the communications system PBX and the first external terminal KE1 when there is a terminal link between the first external terminal KE1 and a further terminal is transferred via the data link DV in the same way, as described above.

After the terminal link between the first external terminal KE1 and the further terminal has been cleared, the further virtual connection port RP of the teleworking module SLMPX is released by the teleworking computer TC-S and is available for a new link set-up. The virtual connection port FP of the teleworking module SLMPX is not released until after the subscriber has caused the first external terminal KE1 to be signed off. After the signing off, the terminal-oriented signaling information items which are to be transferred from the control unit STE of the communications system PBX to the subscriber is transferred, owing to the deactivation of the call rerouting feature at the communications system PBX, to the connection port of the internal terminal which is assigned to the subscriber—for example to the connection port of the section internal terminal KE4 with the communications-system-internal call number 4711.

A maximum of 255 virtual connection ports can be configured at the teleworking module SLMPX. Furthermore, the teleworking module SLMPX is connected to the switching-matrix unit KN of the communications system PBX in the form of PCM highways on 128 user data channels. Since two user channels are required for each link between a signed-on terminal and a further terminal, a maximum of 64 links between terminals can be set up simultaneously via the teleworking module SLMPX. Since 64 virtual connection ports RP of the teleworking module SLMPX are siezed by the links between terminals when there are a maximum of 64 links between terminals set up simultaneously, 191 free virtual connection ports FP of the teleworking module SLMPX are available for signing on terminals to the communications system PBX.

As already mentioned, the "teleworking" concept according to the invention can be utilized both by subscribers who have an office workstation (an internal terminal arranged at the communications system PBX) and by subscribers to whom just one virtual connection port with a communications-system-internal call number (but no physically present terminal) is assigned. The last mentioned type of subscribers are also referred to as "remote call center agents". If such a subscriber is not signed onto the teleworking computer TC-S, all the calls directed to him are diverted to the voice mail box assigned to the subscriber.

A further field of application is for small branches of companies, which are also referred to as satellite offices. Here, we are concerned with a number of external subscribers who are not connected to the local communications network of the company by a dedicated communications system. A teleworking concept based on the invention makes all the performance features provided in the local communications network available to the external subscribers. By signing onto an internal terminal of the local communications network, which takes place in a way analogous to the signing onto the first external terminal KE1 described above, all the calls directed to a terminal assigned to the subscriber in the local communications network are diverted to the internal terminal to which the subscriber has currently signed on. Thus, the subscriber can be reached at any desired terminals in the local communications network on the same call number. In addition to the "call diversion" performance feature, all the signaling information, such as "voice message stored for subscriber" is diverted to the internal terminal to which the subscriber has currently signed on.

I claim:

1. In a communications system with defined performance features available at internal subscriber terminals of the communications system, wherein the internal terminals of the communications system communicate within a framework of a defined signaling protocol, a method of rendering the performance features available at an external terminal via a communications network, the method which comprises:

providing a teleworking subscriber line module (SLMPX) having a switching device (SLMPX-KN) in the communications system;

establishing a data link on a user data channel (ISDN-B channel) of the communications system between the external terminal and the teleworking subscriber line module by signing on to the communications system with the external terminal; and transferring to the external terminal, via the data link, signaling information usually available within the framework of the defined signaling protocol between the internal terminals and the communications system.

2. The method according to claim 1, wherein the step of establishing the data link between the external terminal and the teleworking subscriber line module comprises converting a data format of the user data channel to a data format of a local computer network connected to the teleworking subscriber line module.

3. The method according to claim 1, which comprises controlling the teleworking subscriber line module with a teleworking computer connected to a local computer network, and carrying the signaling information from and to the teleworking subscriber line module via the teleworking computer.

4. The method according to claim 3, which comprises transferring subscriber-specific data from the external terminal via the data link, and authorizing a sign-on with the teleworking computer by referring to the subscriber-specific data.

5. The method according to claim 4, which comprises, in the course of a sign-on operation, assigning to the external terminal a first virtual subscriber connection port of the teleworking subscriber line module with the teleworking computer, and rerouting signaling information routed by a control unit of the communications system to an internal subscriber terminating line identified by the subscriber-specific data to a virtual subscriber connection port.

6. The method according to claim 5, which comprises, while establishing a data link, subsequent to the sign-on, between the external terminal and a further terminal, setting up a first partial link between the further terminal and the first virtual subscriber connection port of the teleworking subscriber line module.

7. The method according to claim 3, which comprises deciding in the teleworking subscriber line module, with reference to destination address information contained in signaling information transmitted from the teleworking computer or from the control unit to the teleworking subscriber line module, whether the signaling information received by the teleworking computer is to be transferred on to the control unit, or the signaling information received by the control unit is to be transferred on to the teleworking computer.

8. The method according to claim 7, which comprises, while establishing a data link, subsequent to the sign-on, between the external terminal and a further terminal, setting up a first partial link between the further terminal and a first virtual subscriber connection port of the teleworking subscriber line module.

9. The method according to claim 8, which further comprises in the course of establishing the link, setting up a second partial link between a second virtual subscriber connection port of the teleworking subscriber line module and the external terminal.

10. The method according to claim 9, which comprises coupling the first and second partial links to one another in the teleworking subscriber line module, forming a link between terminals.

11. The method according to claim 8, which comprises simultaneously routing a plurality of terminal links in each case between one external terminal signed on to the communications system and one further terminal via the teleworking subscriber line module.

12. The method according to claim 1, which comprises setting up the internal subscriber terminating line merely in a form of a virtual connection port.

13. The method according to claim 1, which comprises connecting the external terminal to the communications system via a network selected from the group consisting of an ISDN-oriented communications network, an analog communications network, and a radio communications network.

14. The method according to claim 1, which comprises signing an internal terminal onto the communications system.

15. A teleworking subscriber line module in a communications system, the communications system having a control unit and a switching matrix unit with a bi-directional, time-division-multiplex-oriented port, comprising:

a LAN connection unit having a LAN interface for connecting to a local computer network;

a signaling unit having an HDLC interface for connecting to the control unit of the communications system;

a PCM connection unit having a PCM interface for connecting to the bi-directional, time-division-multiplex-oriented port of the switching matrix unit of the communications system, said PCM connection unit having a switching device (SLMPX-KN) for switching user data links routed via said PCM interface; and a conversion unit connected to said signaling unit and to said PCM connection unit for converting and forwarding data between said signaling unit and said PCM connection unit in accordance with a given protocol.

* * * * *